United States Patent [19]

Hargrave et al.

[11] Patent Number: 5,774,812

[45] Date of Patent: Jun. 30, 1998

[54] METHOD OF VOTING MULTIPLE DIGITAL FRAMES SIMULTANEOUSLY

[75] Inventors: Phillip C. Hargrave; Laura B. Kleinschmidt, both of Palatine; David P. Helm, Glendale Heights, all of Ill.

[73] Assignee: Motorola, Inc., Schaumburg, Ill.

[21] Appl. No.: 606,700

[22] Filed: Feb. 23, 1996

[51] Int. Cl.$^6$ ...................................................... H04B 7/10
[52] U.S. Cl. .......................... 455/524; 455/133; 375/347; 375/368
[58] Field of Search .................................... 455/517, 524, 455/63, 133, 134, 135; 375/347, 356, 368

[56] References Cited

U.S. PATENT DOCUMENTS

| | | | |
|---|---|---|---|
| 5,113,413 | 5/1992 | Brown et al. | 455/133 |
| 5,131,003 | 7/1992 | Brown et al. | 455/133 |
| 5,131,010 | 7/1992 | Perrence et al. | 455/133 |
| 5,268,933 | 12/1993 | Averbuch | 375/356 |
| 5,430,774 | 7/1995 | Dupuy | 375/368 |

*Primary Examiner*—Edward F. Urban
*Attorney, Agent, or Firm*—Susan L. Lukasik

[57] ABSTRACT

A method for use by a voter in a communication system includes the steps of receiving (201) a frame of information, wherein the received frame has a frame number. It is determined if a reference frame for the frame number exists (203). If a reference frame for the frame number does not exist, the received frame is set (205) as a current reference frame for the frame number and an output criterion is set (207) for the frame number. When the output criterion for the frame number is satisfied, the current reference frame is output (211) as the output frame for the frame number. If a reference frame for the frame number exists, the frame is voted (209) against the reference frame for the frame number, yielding the current reference frame.

11 Claims, 2 Drawing Sheets

FIG. 3
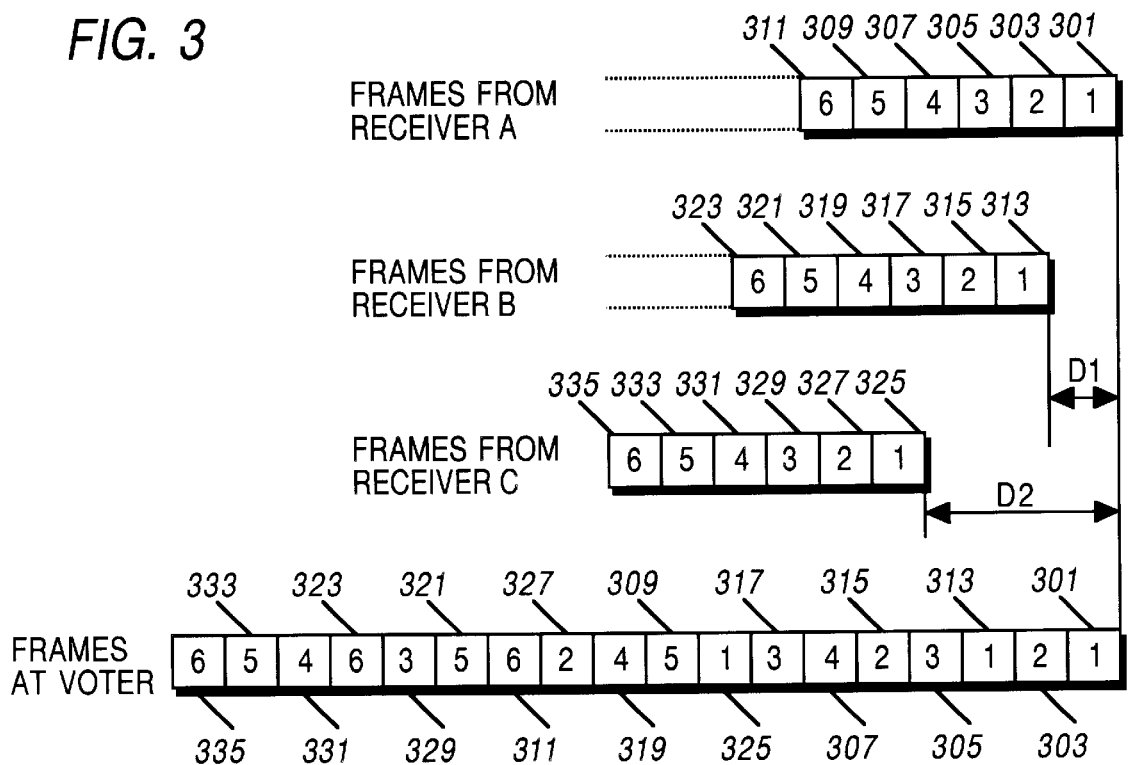
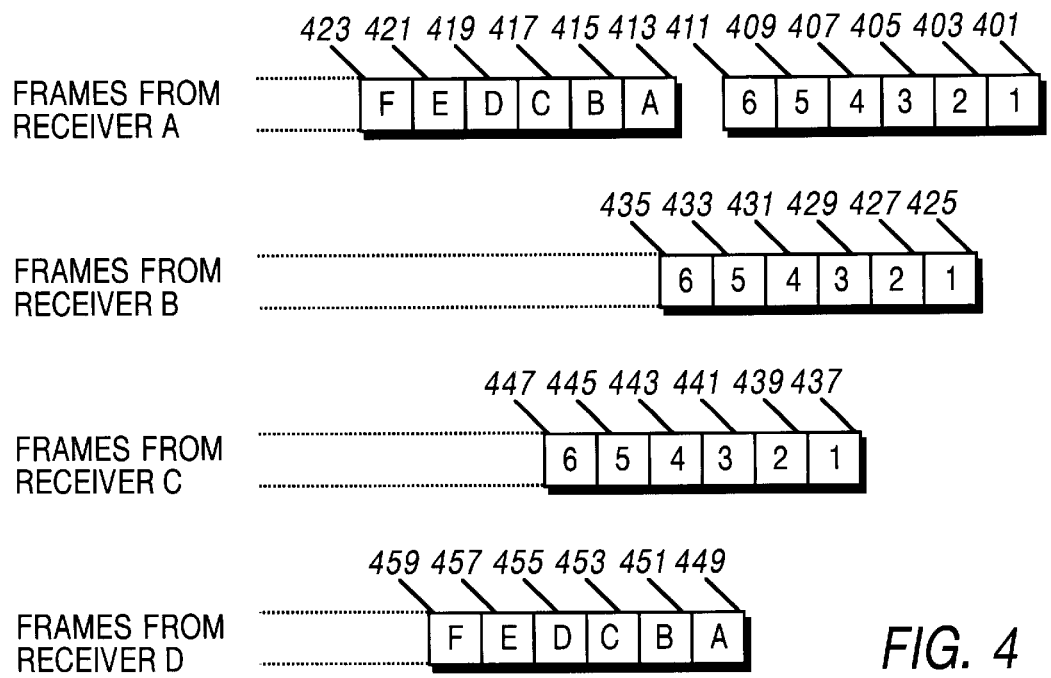
FIG. 4

5,774,812

METHOD OF VOTING MULTIPLE DIGITAL FRAMES SIMULTANEOUSLY

FIELD OF THE INVENTION

This invention relates to communication systems, including but not limited to voting methods in communication systems.

BACKGROUND OF THE INVENTION

In many radio communication systems designed to service a large area, it is often desirable to provide a number of receivers, each positioned at a different location within the area to be serviced. Typically, the receivers have overlapping effective reception ranges so that any messages transmitted within the area will be picked up by at least one receiver on the same frequency or channel. As an example of such a system, a communication unit transmits via a radio frequency (RF) communication resource a message that is received by three remote receivers. Each of the receivers sends its received signal to a voter, typically by wireline communications. The voter receives and compares each message from each of the receivers and outputs a message that is comprised of either an entire message from one of the receivers or a composite message comprised of segments of the messages received from one or more of the receivers. Each message may be comprised of a plurality of message frames.

Typically, the voter receives the communication unit's message from each of the receivers at different times due to the various geographical differences between the receivers, such as communication delays between the receivers and the voter, as may be caused by the transport mechanism from the receivers to the voter. The delays between reception of the same frame or message from different receivers are referred to as differential delays.

For example, in a situation where three receivers relay a message from a single communication unit to the voter, the voter may receive the first frame of the message from a first receiver at a time 30 milliseconds later than the voter receives the first frame from a second receiver. In addition, the voter may receive the first frame from a third receiver 80 milliseconds later than the voter receives the first frame from the second receiver. If these delays are greater than the length of a frame, the voter may throw away necessary frames that arrive later because 1) the voter does not know when it will receive the last copy of a message frame from the receivers, and 2) in typical voting systems, voters are only capable of handling a single frame number of a message at one time, and throws away any other frames it receives that do not have that frame number.

Previous solutions include delaying all messages before they reach the voter and after a predetermined delay time, these messages from each receiver are simultaneously launched to the voter, so that the voter may vote on the message, one frame at a time. If a system has very long differential delays at the voter, such a delaying method may be very time consuming. Other solutions include buffering all incoming messages to the voter, but the amount of buffering required would be extensive and the process would remain very time consuming overall.

Accordingly, there is a need for a method of voting which can handle various different delay times and multiple different transmissions within a short period of time without adding unnecessary delays to the voting process.

BRIEF DESCRIPTION OF THE DRAWINGS

FIG. 3 depicts a set of timing diagrams showing delays in voter reception from various receivers in accordance with the invention.

FIG. 4 depicts a set of timing diagrams showing reception of messages from different communication units in accordance with the invention.

DESCRIPTION OF A PREFERRED EMBODIMENT

Figure 1:
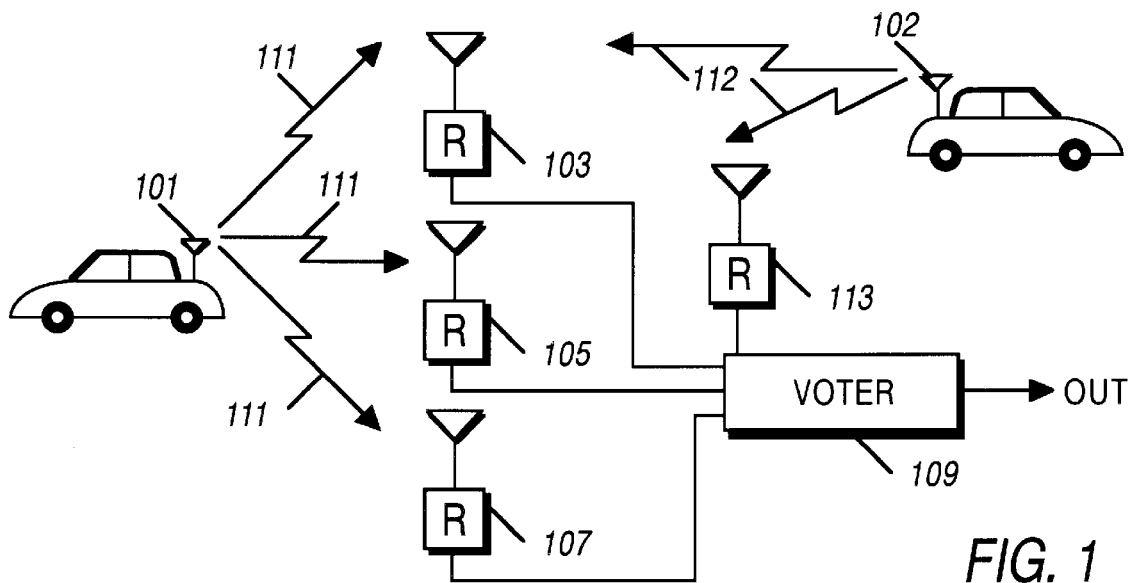
FIG. 1 is a block diagram of a communication system including a voter in accordance with the invention.

The following describes an apparatus for and method of voting in a communication system without adding unnecessary delays to the voting process. A method is provided wherein frames from one or more messages and/or one or more receivers may be handled in the order in which the messages are received by the voter. Neither the receivers, nor the voter, nor any other entity need delay or otherwise process the messages or frames of the messages so that all related frames or messages line up for the voter to perform a simultaneous vote, i.e., where the voter is fed all frames from the same part of a message at one time, votes all these frames, and ignores any subsequent frames that are from the same part of the message. In addition, when multiple messages are currently being processed within the communication system, the voter in the present invention is able to begin processing a later received message before processing of a previously received message is completed by the voter.

A method for use by a voter in a communication system comprises the steps of receiving a frame of information, wherein the received frame has a frame number. It is determined if a reference frame for the frame number exists. If a reference frame for the frame number does not exist, the received frame is set as a current reference frame for the frame number and an output criterion is set for the frame number. When the output criterion for the frame number is satisfied, the current reference frame is output as the output frame for the frame number. In addition, if a reference frame for the frame number exists, the frame may be voted against the reference frame for the frame number, yielding the current reference frame. As an example, the step of setting an output criterion for the frame number comprises the step of starting a timer for the frame number and the output criterion for the frame number is satisfied when the timer expires for the frame number.

Alternatively, a method for use by a voter in a communication system comprises the steps of receiving a first frame of information, wherein the first frame has a first frame number, and wherein a reference frame is not associated with the first frame number; setting the first frame as a first reference frame for the first frame number; and setting a first output criterion for the first frame number. A second frame of information is received, wherein the second frame has a second frame number, and wherein a reference frame is not associated with the second frame number; the second frame is set as a second reference frame for the second frame number; and a second output criterion is set for the second frame number. A third frame of information is received, wherein the third frame has the first frame number. The third frame is voted against the first reference frame for the first frame number, yielding a current first reference frame. When the first output criterion is satisfied for the first frame number, the current first reference frame is output as the output frame for the first frame number. In addition, the step of setting a first output criterion for the first frame number may comprise the step of starting a first timer for the first frame number, and the first output criterion is satisfied when the first timer expires. Further, when the second output criterion is satisfied for the second frame number, the current second reference frame may be output as the output frame for the second frame number. In addition, the step of setting a second output criterion for the second frame number may comprise setting a second timer for the second frame number, and the second output criterion is satisfied when the second timer expires.

A block diagram of a communication system including a voter in accordance with the invention is shown in FIG. 1. A first communication unit 101 transmits, via a radio frequency (RF) communication resource, a message 111 that is received by three remote receivers 103, 105, and 107. Each of the receivers 103, 105, and 107 sends its received signal to the voter 109, typically by wireline communications. The voter 109 receives and compares each message or message set of message frames from each of the receivers 103, 105, and 107 and outputs a message that is comprised of either an entire message from one of the receivers 103, 105, or 107 or a composite message comprised of portions of the messages received from one or more of the receivers 103, 105, and 107. The voter may be an ASTROTAC™ voter, available from Motorola, Inc., modified to include the method set forth in FIG. 2, as described below. FIG. 1 also shows a second communication unit 102 that transmits, via an RF communication resource, a message 112 that is received by two remote receivers 103 and 113. Although only four receivers 103, 105, 107, and 113 are shown in the drawings, successful practice of the present invention may be obtained with only two receivers or with more than four receivers. In the preferred embodiment, the output of the voter 109 is sent to a base station or repeater such as a QUANTAR™ base station, available from Motorola, Inc., which base station retransmits the message, as is known in the art.

In the preferred embodiment, the following measures are used. Each message is transmitted as a plurality of frames, as is known in the art. Each frame is 20 milliseconds in length, and a message is comprised of one or more frames. In addition, each frame is assigned a frame number by the communication unit. In the preferred embodiment, frame numbers are unique for more frames than would be transmitted during the largest differential delay in the communication system.

Figure 2:
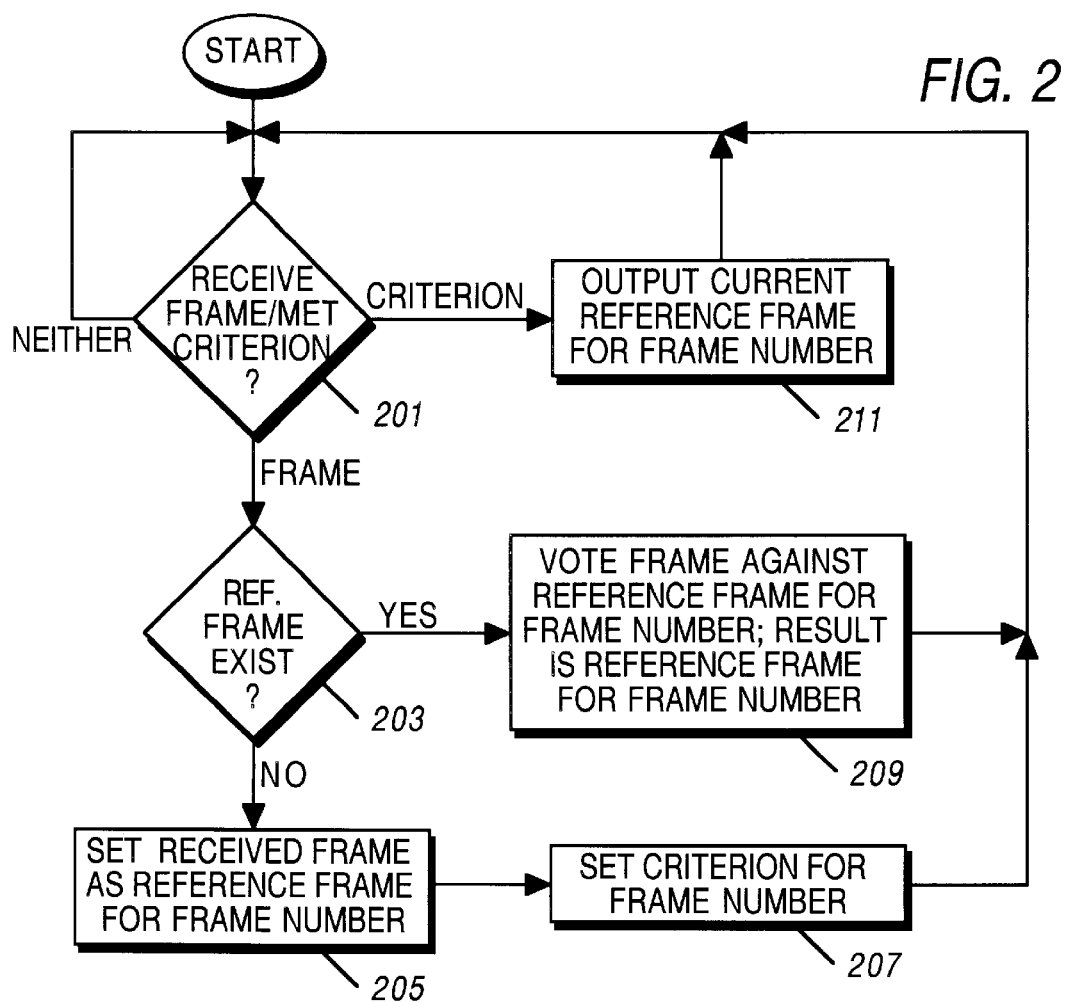
FIG. 2 is a flowchart showing a method of voting in a communication system in accordance with the invention.

A flow chart showing a method of voting in a communication system in accordance with the present invention is shown in FIG. 2. The steps of the flow chart of FIG. 2 are performed by the voter 109 in the preferred embodiment. At step 201, the voter 109 determines if it has received a frame (having a frame number) from a message or if a criterion has been met, i.e., satisfied, for any frame number. If the voter has received a frame from a message, the process continues at step 203, where the voter determines the frame number from the received frame and determines if a reference frame exists for the frame number. In the preferred embodiment, each frame has a frame number, and each frame number has a reference frame.

If no reference frame exists at step 203, the process continues at step 205, where the voter sets the received frame as the current reference frame for this frame number. At step 207, a criterion is set for this frame number. In the preferred embodiment, setting the criterion comprises setting a time on a timer. In the preferred embodiment, the timer's time value for the frame number is determined by taking the longest differential delay and subtracting from it the shortest differential delay in the system (e.g., D2 in FIG. 3). Alternatively, setting the criterion may comprise setting a counter for each frame number, where the value of the counter is set to a maximum number of frames that may be voted for a particular frame number, communication unit, and so forth. Each time a frame is received with that frame number, the counter counts down by one.

If at step 203 a reference frame does exist, the process continues with step 209, where the received frame is voted against the reference frame (as was determined to exist in step 203) for this frame number. The result of the vote is a reference frame, which is stored as the current reference frame for this frame number, and the process continues with step 201.

If at step 201, the voter 109 determines that a criterion has been met, i.e., satisfied, a frame number for this criterion is determined and the current reference frame for this frame number is output as the output for this particular frame number at step 211, and the process continues with step 201. In the preferred embodiment, the criterion being satisfied is the same criterion as was set in step 207. For example, if at step 207 a timer was set, the criterion is satisfied when the timer expires; if a counter was set, the criterion is satisfied when the counter reaches zero (or the maximum value of the counter if an upcounter is utilized). If at step 201, neither a frame is received nor a criterion is met, i.e., satisfied, the process continues with step 201 until either event occurs.

A set of timing diagrams showing delays in voter reception of the same message 111 from multiple receivers 103, 105, and 107 is shown in FIG. 3. In this example, the communication unit 101 transmits a message 111 that is received by three receivers 103, 105, and 107. The first receiver 103 is receiver A, the second receiver 105 is receiver B, and the third receiver 107 is receiver C. The voter 109 receives the frames of the messages in this order: frame 301, frame 303, frame 313, frame 305, frame 315, frame 307, frame 317, frame 325, frame 309, frame 319, frame 327, frame 311, frame 321, frame 329, frame 323, frame 331, frame 333, and frame 335. In the preferred embodiment, the delay between receiving the same frame from receiver A and receiver B is approximately 27 milliseconds, because each frame is 20 milliseconds in duration. Similarly, the delay between receiving the same frame from receiver A and receiver C is approximately 67 milliseconds.

Considering the flowchart of FIG. 2 and the example timing diagrams of FIG. 3, the method for voting may be described as follows. A first receiver and a second receiver receive a message comprising at least two frames. The voter receives a first frame from the first receiver, wherein the first frame from the first receiver has a first frame number. The voter receives a second frame from the first receiver, wherein the second frame from the first receiver has a second frame number, and wherein the first frame number and the second frame number are different. The voter receives a first frame from the second receiver, wherein the first frame from the second receiver has the first frame number. The voter votes the first frame from the first receiver against the first frame from the second receiver, yielding a current reference frame for the first frame number. The current reference frame for the first frame number is output when an output criterion for the first frame number is satisfied. Additional steps may include receiving, by the voter, a second frame from the second receiver, wherein the second frame from the second receiver has the second frame number. The voter votes the second frame from the first receiver against the second frame from the second receiver, yielding a current reference frame for the second frame number and outputs the current reference frame for the second frame number when an output criterion for the second frame number is satisfied.

A set of timing diagrams showing delays in voter reception of two messages 112 from multiple receivers 103, 105, 107, and 113 is shown in FIG. 4. In this example, the first communication unit 101 transmits a message 111 that is received by three receivers 103, 105, and 107. The first receiver 103 is receiver A, the second receiver 105 is receiver B, and the third receiver 107 is receiver C. In addition, the second communication unit 102 transmits a message 112 that is received by two receivers 103 and 113. The first receiver 103 is receiver A and the fourth receiver 113 is receiver D. Although FIG. 4 shows that the second message 112 is received by receiver A 103, successful practice of the present invention does not require that any particular receivers receive a message. The voter 109 receives the frames of the messages in this order: frame (number 1) 401, frame (number 2) 403, frame (number 1) 425, frame (number 3) 405, frame (number 2) 427, frame (number 4) 407, frame (number 3) 429, frame (number 1) 437, frame (number 5) 409, frame (number 4) 431, frame (number 2) 439, frame (number 6) 411, frame (number 5) 433, frame (number 3) 441, frame (number A) 449, frame (number 6) 435, frame (number 4) 443, frame (number B) 451, frame (number A) 413, frame (number 5) 445, frame (number C) 453, frame (number B) 415, frame (number 6) 447, frame (number D) 455, frame (number C) 417, frame (number E) 457, frame (number D) 419, frame (number F) 459, frame (number E) 421, and frame (number F) 423.

The steps of the flowchart will now be applied to the example of FIG. 4. For this example, setting the criterion will be assumed to be setting a downcounter to three for all numerical frame numbers and setting a downcounter to two for all alphabetical frame numbers. First, the voter 109 receives frame 401 with frame number 1 and sets frame 401 as the reference frame for frame number 1. The voter 109 then receives frame 403 with frame number 2 and sets frame 403 as the reference frame for frame number 2. Then the voter 109 receives frame 425 with frame number 1 and votes frame 425 against the reference frame for frame number 1, which is currently frame 401. The result of this vote is set as the (current) reference frame for frame number 1. The voter 109 then receives frame 405 with frame number 3 and sets frame 405 as the reference frame for frame number 3. Then the voter 109 receives frame 427 with frame number 2 and votes frame 427 against the reference frame for frame number 2, which is currently frame 403. The result of this vote is set as the (current) reference frame for frame number 2. The voter 109 then receives frame 407 with frame number 4 and sets frame 407 as the reference frame for frame number 4.

Then the voter 109 receives frame 429 with frame number 3 and votes frame 429 against the reference frame for frame number 3, which is currently frame 405. The result of this vote is set as the (current) reference frame for frame number 3.

Then the voter 109 receives frame 437 with frame number 1 and votes frame 437 against the reference frame for frame number 1, which is currently the result of the vote between frames 401 and 425. The result of this vote is set as the (current) reference frame for frame number 1. A criterion satisfied condition is then noted by the voter 109, because the counter for frame number 1 has reached 0, indicating that three frames have been voted for frame number 1. The voter 109 then outputs the current reference frame for frame number 1.

The voter 109 then receives frame 409 with frame number 5 and sets frame 409 as the reference frame for frame number 5. Then the voter 109 receives frame 431 with frame number 4 and votes frame 431 against the reference frame for frame number 4, which is currently frame 407. The result of this vote is set as the (current) reference frame for frame number 4.

Then the voter 109 receives frame 439 with frame number 2 and votes frame 439 against the reference frame for frame number 2, which is currently the result of the vote between frames 403 and 427. The result of this vote is set as the (current) reference frame for frame number 2. A criterion satisfied condition is then noted by the voter 109, because the counter for frame number 2 has reached 0, indicating that three frames have been voted for frame number 2. The voter 109 then outputs the current reference frame for frame number 2.

The voter 109 then receives frame 411 with frame number 6 and sets frame 411 as the reference frame for frame number 6. Then the voter 109 receives frame 433 with frame number 5 and votes frame 433 against the reference frame for frame number 5, which is currently frame 409. The result of this vote is set as the (current) reference frame for frame number 5.

Then the voter 109 receives frame 441 with frame number 3 and votes frame 441 against the reference frame for frame number 3, which is currently the result of the vote between frames 405 and 429. The result of this vote is set as the (current) reference frame for frame number 3. A criterion satisfied condition is then noted by the voter 109, because the counter for frame number 3 has reached 0, indicating that three frames have been voted for frame number 3. The voter 109 then outputs the current reference frame for frame number 3.

The voter 109 then receives frame 449 with frame number A and sets frame 449 as the reference frame for frame number A. Then the voter 109 receives frame 435 with frame number 6 and votes frame 435 against the reference frame for frame number 6, which is currently frame 411. The result of this vote is set as the (current) reference frame for frame number 6.

Then the voter 109 receives frame 443 with frame number 4 and votes frame 443 against the reference frame for frame number 4, which is currently the result of the vote between frames 407 and 431. The result of this vote is set as the (current) reference frame for frame number 4. A criterion satisfied condition is then noted by the voter 109, because the counter for frame number 4 has reached 0, indicating that three frames have been voted for frame number 4. The voter 109 then outputs the current reference frame for frame number 4. The voter 109 then receives frame 451 with frame number B and sets frame 451 as the reference frame for frame number B.

Then the voter 109 receives frame 413 with frame number A and votes frame 413 against the reference frame for frame number A, which is currently frame 449. The result of this vote is set as the (current) reference frame for frame number A. A criterion satisfied condition is then noted by the voter 109, because the counter for frame number A has reached 0, indicating that two frames have been voted for frame number A. The voter 109 then outputs the current reference frame for frame number A.

Then the voter 109 receives frame 445 with frame number 5 and votes frame 445 against the reference frame for frame number 5, which is currently the result of the vote between frames 409 and 433. The result of this vote is set as the (current) reference frame for frame number 5. A criterion satisfied condition is then noted by the voter 109, because the counter for frame number 5 has reached 0, indicating that three frames have been voted for frame number 5. The voter 109 then outputs the current reference frame for frame number 5.

The voter 109 then receives frame 453 with frame number C and sets frame 453 as the reference frame for frame number C. Then the voter 109 receives frame 415 with frame number B and votes frame 415 against the reference frame for frame number B, which is currently frame 451. The result of this vote is set as the (current) reference frame for frame number B. A criterion satisfied condition is then noted by the voter 109, because the counter for frame number B has reached 0, indicating that two frames have been voted for frame number B. The voter 109 then outputs the current reference frame for frame number B.

Then the voter 109 receives frame 447 with frame number 6 and votes frame 447 against the reference frame for frame number 6, which is currently the result of the vote between frames 411 and 435. The result of this vote is set as the (current) reference frame for frame number 6. A criterion satisfied condition is then noted by the voter 109, because the counter for frame number 6 has reached 0, indicating that three frames have been voted for frame number 6. The voter 109 then outputs the current reference frame for frame number 6.

The voter 109 then receives frame 455 with frame number D and sets frame 455 as the reference frame for frame number D. Then the voter 109 receives frame 417 with frame number C and votes frame 417 against the reference frame for frame number C, which is currently frame 453. The result of this vote is set as the (current) reference frame for frame number C. A criterion satisfied condition is then noted by the voter 109, because the counter for frame number C has reached 0, indicating that two frames have been voted for frame number C. The voter 109 then outputs the current reference frame for frame number C.

The voter 109 then receives frame 457 with frame number E and sets frame 457 as the reference frame for frame number E. Then the voter 109 receives frame 419 with frame number D and votes frame 419 against the reference frame for frame number D, which is currently frame 455. The result of this vote is set as the (current) reference frame for frame number D. A criterion satisfied condition is then noted by the voter 109, because the counter for frame number D has reached 0, indicating that two frames have been voted for frame number D. The voter 109 then outputs the current reference frame for frame number D.

The voter 109 then receives frame 459 with frame number F and sets frame 459 as the reference frame for frame number F. Then the voter 109 receives frame 421 with frame number E and votes frame 421 against the reference frame for frame number E, which is currently frame 457. The result of this vote is set as the (current) reference frame for frame number E. A criterion satisfied condition is then noted by the voter 109, because the counter for frame number E has reached 0, indicating that two frames have been voted for frame number E. The voter 109 then outputs the current reference frame for frame number E.

Then the voter 109 receives frame 423 with frame number F and votes frame 423 against the reference frame for frame number F, which is currently frame 459. The result of this vote is set as the (current) reference frame for frame number F. A criterion satisfied condition is then noted by the voter 109, because the counter for frame number F has reached 0, indicating that two frames have been voted for frame number F. The voter 109 then outputs the current reference frame for frame number F.

The voting method may be described as follows. A first communication unit 101 transmits a first message 111 comprising at least two frames to a first receiver and a second receiver. A second communication unit 102 transmits a second message 112 comprising at least one frame to a third receiver and a fourth receiver The voter 109 receives 201 a first frame 401 from the first receiver, wherein the first frame 401 from the first receiver has a first frame number, and sets 207 a first output criterion for the first frame number The voter 109 receives 201 a first frame 425 from the second receiver, wherein the first frame 425 from the second receiver has the first frame number. The voter 109 votes 209 the first frame 401 from the first receiver against the first frame 425 from the second receiver, yielding a current reference frame for the first frame number. The voter 109 receives 201 a first frame 449 from the third receiver, wherein the first frame 449 from the third receiver has a third frame number, and wherein the third frame number is different from the first frame number and the second frame number, and sets 207 a third output criterion for the third frame number. The voter 109 outputs 211 the current reference frame for the first frame number when the first output criterion for the first frame number is satisfied 201.

Additionally, the following steps may be included. The voter 109 receives 201 a second frame 411 from the first receiver, wherein the second frame 411 from the first receiver has a second frame number, and wherein the first frame number and the second frame number are different and sets 207 a second output criterion for the second frame number. The voter 109 receives 201 a second frame 435 from the second receiver, wherein the second frame 435 from the second receiver has the second frame number. The voter 109 votes 209 the second frame 411 from the first receiver against the second frame 435 from the second receiver, yielding a current reference frame for the second frame number. The voter 109 outputs 211 the current reference frame for the second frame number when the second output criterion for the second frame number is satisfied 201.

The following steps may also be included. The voter 109 receives 201 a first frame 413 from the fourth receiver, wherein the first frame from the fourth receiver has the third frame number. The voter 109 votes 209 the first frame 449 from the third receiver against the first frame 413 from the fourth receiver, yielding a current reference frame for the third frame number. The voter 109 outputs 211 the current reference frame for the third frame number when the third output criterion for the third frame number is satisfied 201.

As can be seen from the application of the flowchart of FIG. 2 to the example of FIG. 4, the above method provides an efficient manner for voting in communication systems without adding unnecessary delays or excessive buffers to the voting process. Further, the present method is capable of handing very large differential delays without adding significant delays to the total processing time of the communication system. The present method is a method wherein each frame is handled in the order in which it is received by the voter, without the need to delay the various parts of the message from the different receivers or to simultaneously launch all related messages to the voting process. In addition, when multiple frames or messages are currently being processed within the communication system, the voter in the present invention is able to begin processing a later received frame or message before processing of a previously received frame or message is completed by the voter

What is claimed is:

1. A method for use by a voter in a communication system comprising the steps of:
   a) receiving a frame of information, wherein the received frame has a frame number;
   b) determining if a reference frame for the frame number exists;
   c) if a reference frame for the frame number does not exist,
      c1) setting the received frame as a current reference frame for the frame number;
      c2) setting an output criterion for the frame number;
   d) when the output criterion for the frame number is satisfied, outputting the current reference frame as the output frame for the frame number;
   e) if a reference frame for the frame number exists, voting the frame against the reference frame for the frame number, yielding the current reference frame.

2. The method of claim 1, wherein the step of setting an output criterion for the frame number comprises the step of starting a timer for the frame number and wherein the output criterion for the frame number is satisfied when the timer expires for the frame number.

3. A method for use by a voter in a communication system comprising the steps of:
   a) receiving a first frame of information, wherein the first frame has a first frame number, and wherein a reference frame is not associated with the first frame number;
      a1) setting the first frame as a first reference frame for the first frame number;
      a2) setting a first output criterion for the first frame number;
   b) receiving a second frame of information, wherein the second frame has a second frame number, and wherein a reference frame is not associated with the second frame number;
      b1) setting the second frame as a second reference frame for the second frame number;
      b2) setting a second output criterion for the second frame number;
   c) receiving a third frame of information, wherein the third frame has the first frame number;
   d) voting the third frame against the first reference frame for the first frame number, yielding a current first reference frame;
   e) when the first output criterion is satisfied for the first frame number, outputting the current first reference frame as the output frame for the first frame number.

4. The method of claim 3, wherein the step of setting a first output criterion for the first frame number comprises the step of starting a first timer for the first frame number; wherein the first output criterion is satisfied when the first timer expires.

5. The method of claim 3, further comprising the step of when the second output criterion is satisfied for the second frame number, outputting the current second reference frame as the output frame for the second frame number.

6. The method of claim 5, wherein the step of setting a second output criterion for the second frame number comprises setting a second timer for the second frame number, and wherein the second output criterion is satisfied when the second timer expires.

7. A method for use by a voter in a communication system comprising the steps of:
   receiving, by a first receiver and a second receiver, a message comprising at least two frames;
   receiving, by a voter, a first frame from the first receiver, wherein the first frame from the first receiver has a first frame number;
   receiving, by the voter, a second frame from the first receiver, wherein the second frame from the first receiver has a second frame number, and wherein the first frame number and the second frame number are different;
   receiving, by the voter, a first frame from the second receiver, wherein the first frame from the second receiver has the first frame number;
   voting, by the voter, the first frame from the first receiver against the first frame from the second receiver, yielding a current reference frame for the first frame number;
   outputting, by the voter, the current reference frame for the first frame number when an output criterion for the first frame number is satisfied.

8. The method of claim 7, further comprising the steps of:
   receiving, by the voter, a second frame from the second receiver, wherein the second frame from the second receiver has the second frame number;
   voting, by the voter, the second frame from the first receiver against the second frame from the second receiver, yielding a current reference frame for the second frame number;
   outputting, by the voter, the current reference frame for the second frame number when an output criterion for the second frame number is satisfied.

9. A method for use in a communication system comprising the steps of:
   transmitting, by a first communication unit, a first message comprising at least two frames to a first receiver and a second receiver;
   transmitting, by a second communication unit, a second message comprising at least one frame to a third receiver and a fourth receiver;
   receiving, by a voter, a first frame from the first receiver, wherein the first frame from the first receiver has a first frame number;
   setting, by the voter, a first output criterion for the first frame number;
   receiving, by the voter, a first frame from the second receiver, wherein the first frame from the second receiver has the first frame number;
   voting, by the voter, the first frame from the first receiver against the first frame from the second receiver, yielding a current reference frame for the first frame number;
   receiving, by the voter, a first frame from the third receiver, wherein the first frame from the third receiver has a third frame number, and wherein the third frame number is different from the first frame number and the second frame number;
   setting, by the voter, a third output criterion for the third frame number;

outputting, by the voter, the current reference frame for the first frame number when the first output criterion for the first frame number is satisfied.

10. The method of claim 9, further comprising the steps of:

receiving, by the voter, a second frame from the first receiver, wherein the second frame from the first receiver has a second frame number, and wherein the first frame number and the second frame number are different;

setting, by the voter, a second output criterion for the second frame number;

receiving, by the voter, a second frame from the second receiver, wherein the second frame from the second receiver has the second frame number;

voting, by the voter, the second frame from the first receiver against the second frame from the second receiver, yielding a current reference frame for the second frame number;

outputting, by the voter, the current reference frame for the second frame number when the second output criterion for the second frame number is satisfied.

11. The method of claim 9, further comprising the steps of:

receiving, by the voter, a first frame from the fourth receiver, wherein the first frame from the fourth receiver has the third frame number;

voting, by the voter, the first frame from the third receiver against the first frame from the fourth receiver, yielding a current reference frame for the third frame number;

outputting, by the voter, the current reference frame for the third frame number when the third output criterion for the third frame number is satisfied.

\* \* \* \* \*